Aug. 4, 1953  E. THYS  2,647,626
HOP STEM SEPARATOR
Filed Jan. 26, 1951  2 Sheets-Sheet 1
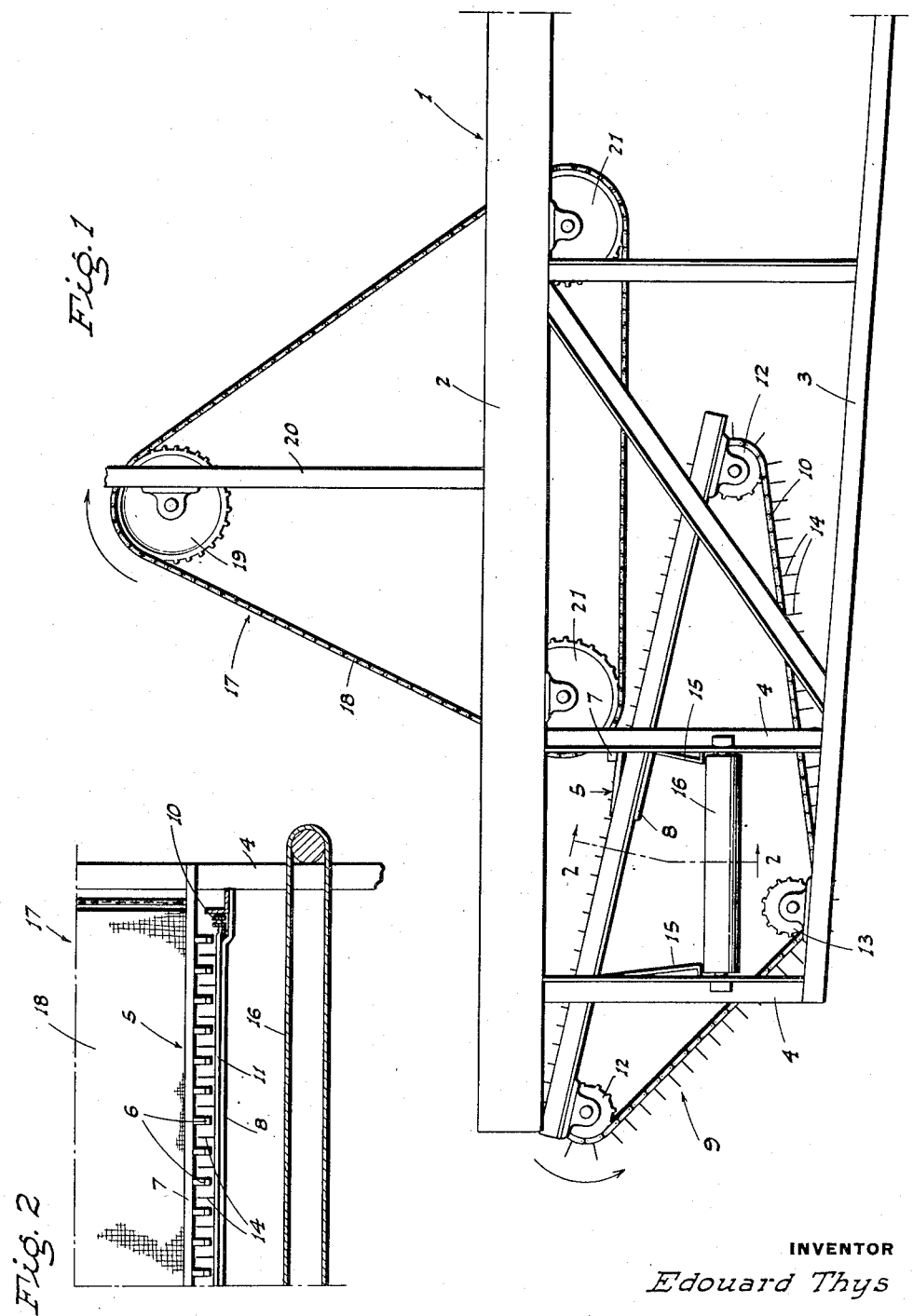
INVENTOR
*Edouard Thys*
BY *Webster & Webster*
ATTORNEYS

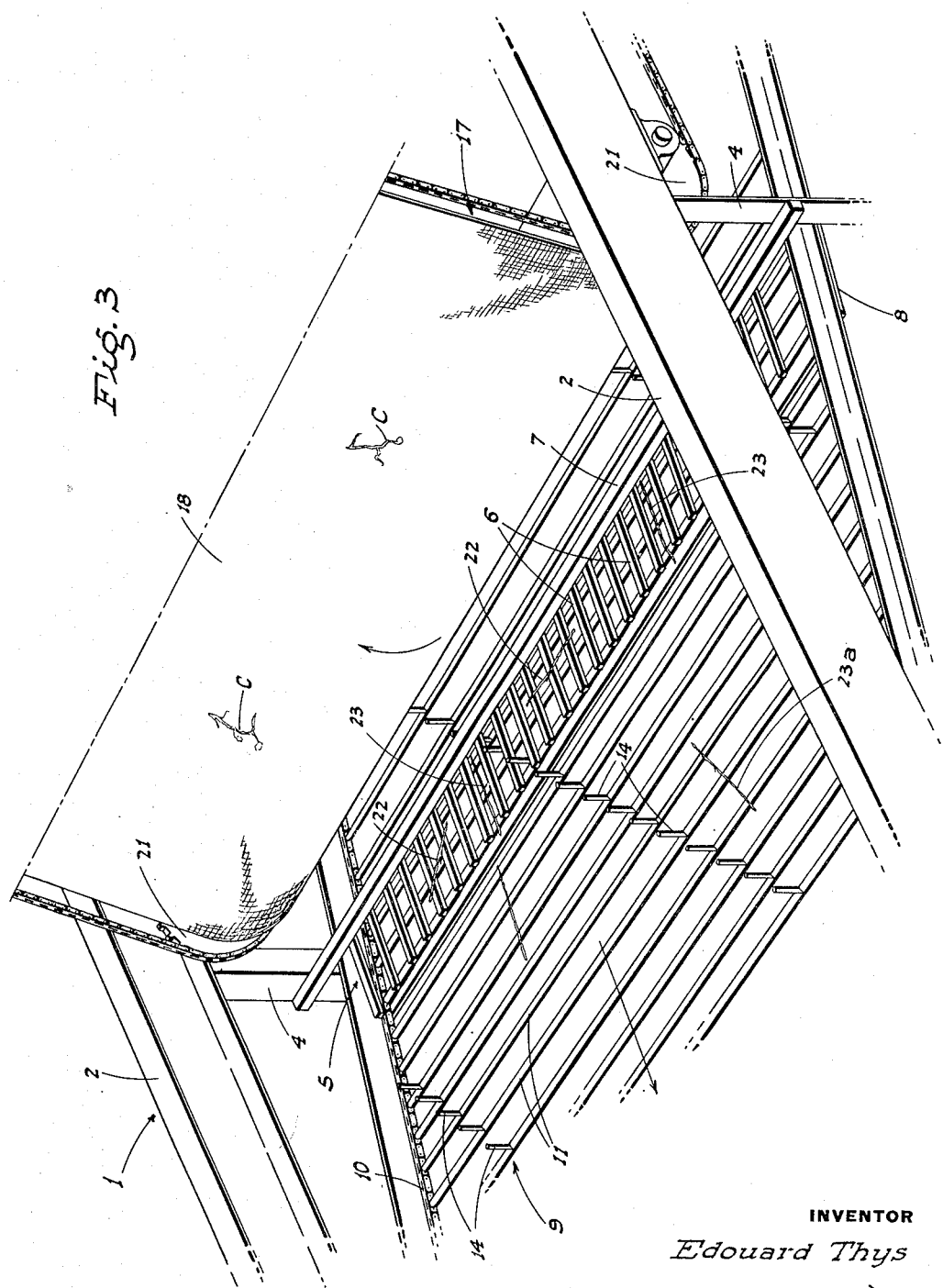

Patented Aug. 4, 1953

2,647,626

UNITED STATES PATENT OFFICE 2,647,626

HOP STEM SEPARATOR

Edouard Thys, Sacramento, Calif.

Application January 26, 1951, Serial No. 208,070

2 Claims. (Cl. 209—73)

This invention relates in general to a hop stem separating machine.

Subsequent to the harvest of hop vines, they are processed mechanically to detach the hops from the stem; it then being necessary to separate the free stems from the detached hops.

The present invention is directed to, and it is a major object to provide, a novel, continuously operative type machine for effecting such separation of the free stems from the detached hops.

Another object of the present invention is to provide a separating machine, as above, which is especially effective for use to accomplish separation of the detached hops from relatively straight stems, and which has heretofore been a difficult task; the stems which are forked or crooked being easier to separate, and being done in advance, i. e. as an initial operative step in the machine.

A further object of this invention is to provide a hop stem separating machine which comprises a novel combination of a grate, a pan beneath the grate, and an endless cross bar type conveyor traveling on the pan closely beneath the grate; the conveyor including upstanding pins which work between the grate bars in a manner to engage and turn stems on the grate, so that such stems fall onto the conveyor in a position for carry-off thereby separate from the detached hops which drop through the grate and conveyor onto the pan for drag discharge therefrom by said conveyor.

It is also an object of the invention to provide a hop stem separating machine which is relatively simple in its structure and not difficult or expensive to manufacture; the machine requiring little maintenance and having a minimum of parts subject to wear or replacement.

Still another object of the invention is to provide a practical and reliable hop stem separator, and yet one which will be exceedingly effective for the purpose for which it is designed.

These objects are accomplished by means of such structure and relative arrangement of parts as will fully appear by a perusal of the following specification and claims.

In the drawings:

Fig. 1 is a side elevation of the improved hop stem separating machine.

Fig. 2 is a fragmentary transverse section on line 2—2 of Fig. 1.

Fig. 3 is an enlarged fragmentary perspective view of the machine; the view looking, from one side, downwardly onto the assembly of the pan, grate, and conveyor.

Referring now more particularly to the characters of reference on the drawings, the machine comprises an upstanding, longitudinally extending main frame, indicated generally at 1, which main frame includes transversely spaced, longitudinally extending upper side beams 2 and corresponding lower side beams 3; corresponding upper and lower side beams being connected, at longitudinally spaced points, by posts 4.

A transversely extending, longitudinally short grate, indicated generally at 5, is mounted in the main frame 1 adjacent but below the upper side beams 2; such grate comprising a multiplicity of short, longitudinal grate bars 6 disposed in spaced apart parallel relation. The grate bars 6 are fixed, at their rear ends, to the under side of, and are supported by, a cross beam 7 which spans in rigid relation between corresponding side posts 4.

A transverse, likewise longitudinally short pan 8 is disposed below the grate 5 in adjacent but spaced relation thereto; the pan being inclined forwardly and upwardly from its rear edge.

An endless conveyor, indicated generally at 9, is mounted in the main frame 1, with the upper run of such conveyor elongated and disposed at a forward and upward incline; said upper run riding across the pan 8, and traveling between the latter and the grate 5.

The endless conveyor 9 is of open, cross bar type and includes endless side chains 10 and a multiplicity of parallel cross bars 11 in adjacent but spaced relation.

The chains 10 of the endless conveyor 9 turn over sprockets 12 which support the upper runs, while the lower runs of said chains engage sprockets 13.

The conveyor 9 is formed with a plurality of diagonal rows of outwardly projecting pins 14, with the pins of each row in diagonal alinement but spaced transversely of the conveyor so that said pins, when in the upper run of the conveyor and moving forwardly, pass in succcession lengthwise through the grate 5. By reason of the diagonal relationship of the pins each works between corresponding grate bars 6, with the row progressing in its action from one side to the other of said grate.

Directly below the forward edge of the pan 5 the main frame 1 is formed with a chute 15 which delivers to an endless, cross conveyor 16 which feeds to a lateral discharge point; the conveyor 16 being driven in any suitable manner.

The numeral 17 indicates generally an upstanding endless draper of triangular configuration in elevation, such draper being of foraminous material and including a forward run 18 which inclines upwardly and rearwardly from a point directly above the grate 5. The draper 17 includes top sprockets 19 carried on a post structure 20, and bottom sprockets 21 journaled in connection with the upper side beams 2; one of the sprocket shafts being driven for the purpose of actuating the draper 17.

When the above described hop stem separating machine is in operation, detached hops and free stems in heterogenous mixture are fed (by means not here shown) onto the forward run 18 of the draper 17 at a point adjacent the top of the latter; the mixed hops and stems tumbling or sliding downward on said forward run contra to the direction of motion thereof.

Those of the free stems which are either forked or crooked catch in the foraminous draper, as at C, being carried over the top thereof and down the rear side for discharge.

The detached hops, and the relatively straight ones of the free stems, continue sliding down the forward run 18 of the draper 17 and escape therefrom directly above the grate 5.

The detached hops fall through said grate 5 and come to rest on the pan 8, whence they are swept or dragged forward by the cross bars 11 of the endless conveyor 9 to discharge off the front edge of said pan into the chute 15 and onto the cross conveyor 16.

The relatively straight, free stems which fall from the forward run 18 of the draper 17, if lying transversely, engage and span between adjacent grate bars 6, as at 22, or, if lying lengthwise, fall between adjacent grate bars 6 and span between adjacent conveyor cross bars 11, as at 23; in neither event passing through to the pan 8. The stem which fall transversely onto and between the grate bars 5, as at 22, are engaged by the corresponding pin 14 as the diagonal rows of such pins work forward through the grate; the pins engaging such transverse stems and turning them until they are substantially lengthwise, whereupon the stems drop between the grate bars 6 lengthwise thereof and span between adjacent cross bars 11, being supported thereby. Thus, whether the relatively straight, free stems are caught transversely across the grate bars 6 in the first instance, or are first caught directly lengthwise in spanning relation to adjacent cross bars 11, they all ultimately occupy this latter position as the rows of upstanding pins 14 sweep through the grate 5. In short, those of the stems which are not longitudinally disposed at the outset are so turned by the pins 14 during the continuous operation of the machine.

Beyond or forwardly of the grate 5 the stems are carried on the conveyor, as at 23a, discharging off said conveyor at the front end.

With the described machine, hop stems, both the forked or crooked ones, together with the relatively straight ones, are effectively separated from the detached hops.

From the foregoing description it will be readily seen that there has been produced such a device as substantially fulfills the objects of the invention, as set forth herein.

While this specification sets forth in detail the present and preferred construction of the device, still in practice such deviations from such detail may be resorted to as do not form a departure from the spirit of the invention, as defined by the appended claims.

Having thus described the invention, the following is claimed as new and useful, and upon which Letters Patent are desired:

1. In a machine for separating detached hops from free stems, an endless open work conveyor arranged to pass hops therethrough, said conveyor having an upper generally horizontal run, a grate relatively close to and above said upper run, said grate comprising a plurality of longitudinal bars spaced to allow the passage of hops and stem lengthwise therebetween, means to feed mixed hops and stems onto the grate from above so that some of such stems tend to rest transversely on and span adjacent grate bars, and elements on the conveyor cooperating with the grate upon longitudinal movement of the conveyor and arranged to engage any stems supported on the grate transversely thereof and turn such stems so that they will be deposited on the conveyor in a direction lengthwise thereof.

2. In a machine for separating detached hops from free stems, an endless conveyor including transverse bars spaced apart lengthwise of the conveyor to pass hops therebetween, said conveyor having a generally horizontal upper run, a grate above and relatively close to said run comprising a plurality of longitudinal bars spaced to allow the passage of hops and stems lengthwise therebetween, and transversely spaced diagonal rows of pins on and projecting outwardly from the conveyor disposed to pass between the grate bars and of a length to extend above said bars; the transverse spacing of the rows of pins being greater than the combined width of a plurality of the grate bars and the spacing therebetween.

EDOUARD THYS.

References Cited in the file of this patent

UNITED STATES PATENTS

| Number | Name | Date |
|---|---|---|
| 376,229 | Binkley | Jan. 10, 1888 |
| 907,947 | Asplund | Dec. 29, 1908 |
| 1,442,526 | Hungerford | Jan. 16, 1923 |
| 2,311,169 | Gordon et al. | Feb. 16, 1943 |